United States Patent [19]

Furney et al.

[11] Patent Number: 5,060,136
[45] Date of Patent: Oct. 22, 1991

[54] FOUR-WAY ASSOCIATIVE CACHE WITH DLAT AND SEPARATELY ADDRESSABLE ARRAYS USED FOR UPDATING CERTAIN BITS WITHOUT READING THEM OUT FIRST

[75] Inventors: Richard W. Furney, Johnson City; Gordon C. Hurlbut, Vestal; Michael P. Vachon, Apalachin, all of N.Y.

[73] Assignee: International Business Machines Corp., Armonk, N.Y.

[21] Appl. No.: 293,913

[22] Filed: Jan. 6, 1989

[51] Int. Cl.$^5$ .................. G06F 13/08; G06F 9/36
[52] U.S. Cl. .................. 364/200; 364/243.4; 364/243.41; 364/253; 364/253.2; 364/266.3; 364/246; 364/246.12; 364/246.3; 364/900; 364/962.1; 364/963.3; 364/964.2; 364/964.34
[58] Field of Search ... 364/200 MS File, 900 MS File

[56] References Cited

U.S. PATENT DOCUMENTS

| 3,588,829 | 6/1971 | Boland et al. | 364/200 |
| 3,840,863 | 10/1974 | Fugua et al. | 340/172.5 |
| 3,958,228 | 5/1976 | Coombes et al. | 340/172.5 |
| 4,008,460 | 2/1977 | Bryant et al. | 340/172.5 |
| 4,168,541 | 9/1979 | DeKarske | 365/230 |
| 4,322,795 | 3/1982 | Lange et al. | 364/200 |
| 4,464,712 | 8/1984 | Fletcher | 364/200 |
| 4,695,950 | 9/1987 | Brandt et al. | 364/200 |
| 4,807,110 | 2/1989 | Pomevene et al. | 364/200 |
| 4,833,601 | 5/1989 | Barlow et al. | 364/200 |
| 4,835,686 | 5/1989 | Furuya et al. | 364/200 |
| 4,843,541 | 6/1989 | Bean et al. | 364/200 |
| 4,905,141 | 2/1990 | Brenza | 364/200 |

OTHER PUBLICATIONS

IBM TDB, vol. 14, No. 2, Jul. 1971, A. Weinberger, Buffer Store Replacement by Selection Based on Probable Least Recent Usage.
IBM TDB, vol. 23, No. 12, May 1981, R. L. Hoffman, G. R. Mitchell and F. G. Soltis, Reference and Change Bit Recording.

Primary Examiner—Thomas C. Lee
Assistant Examiner—Mehmet Geckil
Attorney, Agent, or Firm—John C. Black; Arthur J. Samodovitz

[57] ABSTRACT

A cache storage system is disclosed which has a high speed buffer (cache), a directory-look-aside-table, and apparatus for maintaining binary coded information signifying the order of use of various sections of the cache. A separately addressable and controllable storage array is provided for each bit position of the binary code so that updating of a code is accomplished by selectively writing certain but not all of the bits in the arrays storing said bits to be updated. This avoids the need to read all bits from an array, change the appropriate bits, then write all bits back into the array. Bits signifying the changed or unchanged state of data in said various sections of the cache are also stored in separately addressable arrays to permit updating of their value merely by selectively writing to the appropriate array.

4 Claims, 2 Drawing Sheets

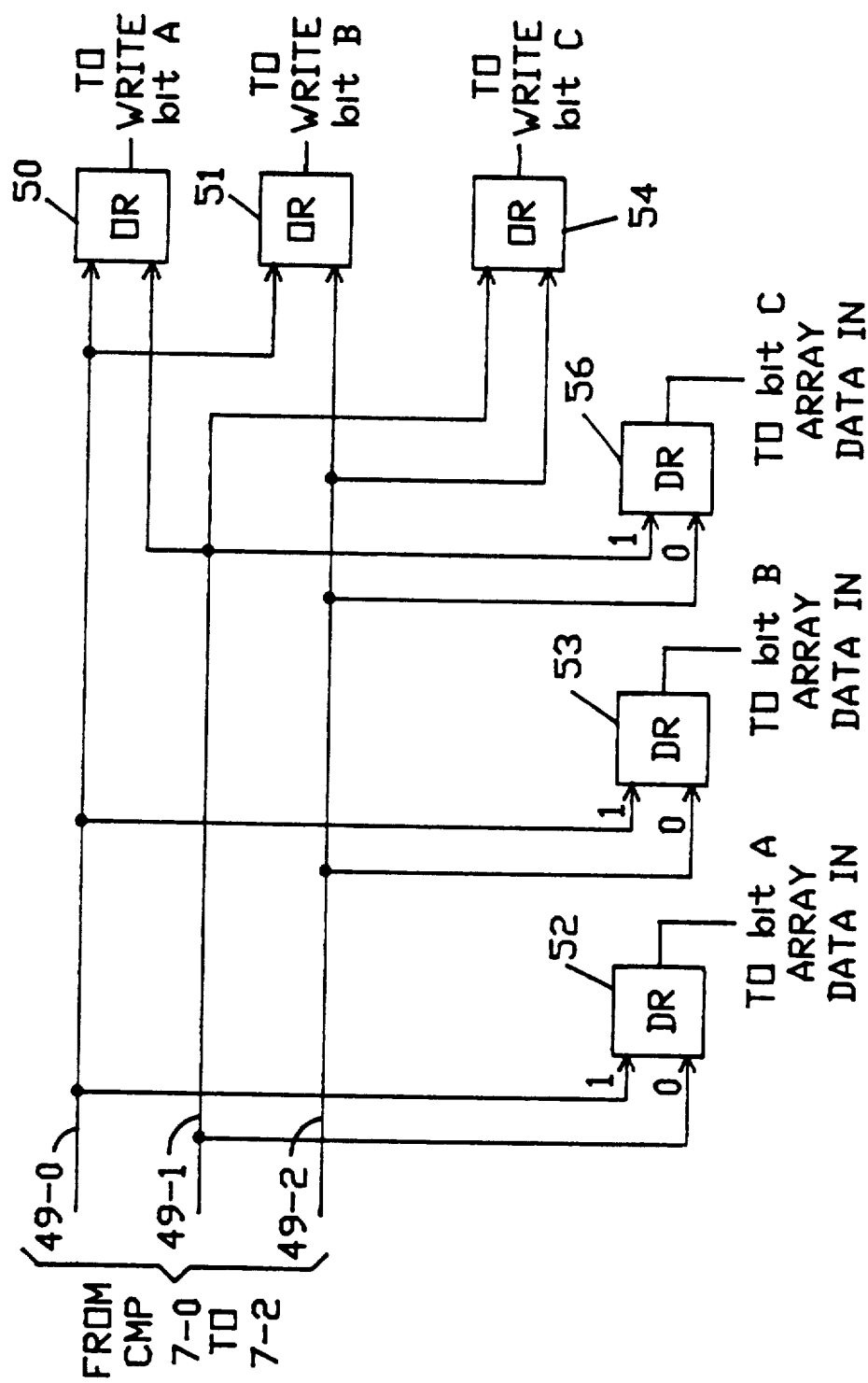

FOUR-WAY ASSOCIATIVE CACHE WITH DLAT AND SEPARATELY ADDRESSABLE ARRAYS USED FOR UPDATING CERTAIN BITS WITHOUT READING THEM OUT FIRST

RELATED APPLICATION

"LRU Error Detection Using the Collection of Read and Written LRU Bits" by J. J. Dulzo et al, 07,294,021, filed of even date herewith and assigned to the same assignee as named herein.

BACKGROUND OF THE INVENTION

1. Field of Use

The present improvement relates to apparatus for maintaining information signifying the order of use of a plurality of units.

2. Prior art

In data processing systems having a plurality of units which are used in random sequence, there is a need to share the use of the various units; and to achieve an optimum level of performance, there is a further need to assign for each new use a unit which is least likely to require further utilization by the use currently assigned to the unit.

The preferred embodiment of the present improvement is incorporated in a cache storage system having high speed buffer storage (cache), a directory-look-aside-table (DLAT), and least recently used (LRU) or at least quasi LRU apparatus for maintaining binary coded information related to the sequence use of various sections of the buffer storage.

The cache and its DLAT are divided into a plurality of congruence classes and each congruence class includes a plurality of associativity classes. The LRU comprises a storage array having one position for each congruence class and storing therein the usage data (LRU binary code) of the associativity classes of the respective congruence class. A description of such cache storage systems is found in many patents and publications, for example, U.S. Pat. No. 3,588,829, entitled, "Integrated Memory System With Block Transfer To A Buffer Store", issued to Boland, et al on June 28, 1971 and assigned to the assignee of the present invention.

During the operation of known cache systems of this type, the LRU binary code for each congruence class is updated with each successful access to (use of) a cache storage area corresponding to one of the associativity classes of the congruence class of interest. Depending upon which associativity class is selected for access, certain LRU bits of the binary code must be updated. Remaining bits of the binary code do not require updating because they maintain the history of previous accesses and do not change.

In addition, the LRU storage array includes in each congruence class position one "modify" bit for each associativity class. Each of these bits is set to "0", when new data is entered into the cache area corresponding to the associativity class.

The modify bit is changed to a "1" only if this new data is modified, for example by a CPU write to cache. Hence, these modify bits must be updated during system operation.

Because not all LRU bits in an LRU binary code are updated during successful accesses to the cache, known systems have typically read out, from the appropriate LRU array position, all of the binary code bits, both those requiring update and those that do not. The former bits are updated and all bits, updated and non-updated, are returned to the array position. This is referred to in the prior art as a READ/MODIFY/WRITE (RMW) cycle for update operations.

It is necessary for system performance to successfully perform the RMW cycle during a CPU system cycle. As system speeds increase, the RMW cycle places limitations on system cycle times.

It is, therefore a primary object of the present improvement to minimize the time required for updating usage data and/or modify bits.

It is a more specific object of the present improvement to perform LRU and/or modify bit updating without the need for a RMW cycle of operation.

SUMMARY OF THE INVENTION

The above objects are achieved in a preferred embodiment of the present improvement by providing an LRU storage array which has an individually and separately addressable array for each bit position of the LRU binary codes. For example, one preferred embodiment includes four associativity classes for each congruence class, and three LRU bits are provided in each quasi LRU binary code.

Therefore, three separately addressable arrays are provided in the LRU storage array, one for each LRU binary code bit.

During each LRU update, only two of the binary code bit positions are written into; no binary code bits are read out because the "write only" update is complete without a READ subcycle.

In addition, four separately and individually addressable storage arrays are provided, one for each of the modify bits. Thus there is no need to read out all modify bits when only one requires updating. The one requiring updating is merely "written into" to complete the update function.

To provide error detection, each of the seven separately addressable arrays includes two bit positions for each congruence class, one for the LRU or modify bit and one for a parity bit. When LRU and/or modify bits are written into the arrays, an appropriate parity bit is generated and stored with each LRU or modify bit.

The foregoing and other objects, features and advantages of the improvement will be apparent from the following description of the preferred embodiment illustrated in the accompanying drawing.

DESCRIPTION OF THE DRAWINGS

FIG. 2 illustrates partial details of an alternative embodiment using a classical LRU algorithm.

DESCRIPTION OF THE PREFERRED EMBODIMENT

Figure 1:
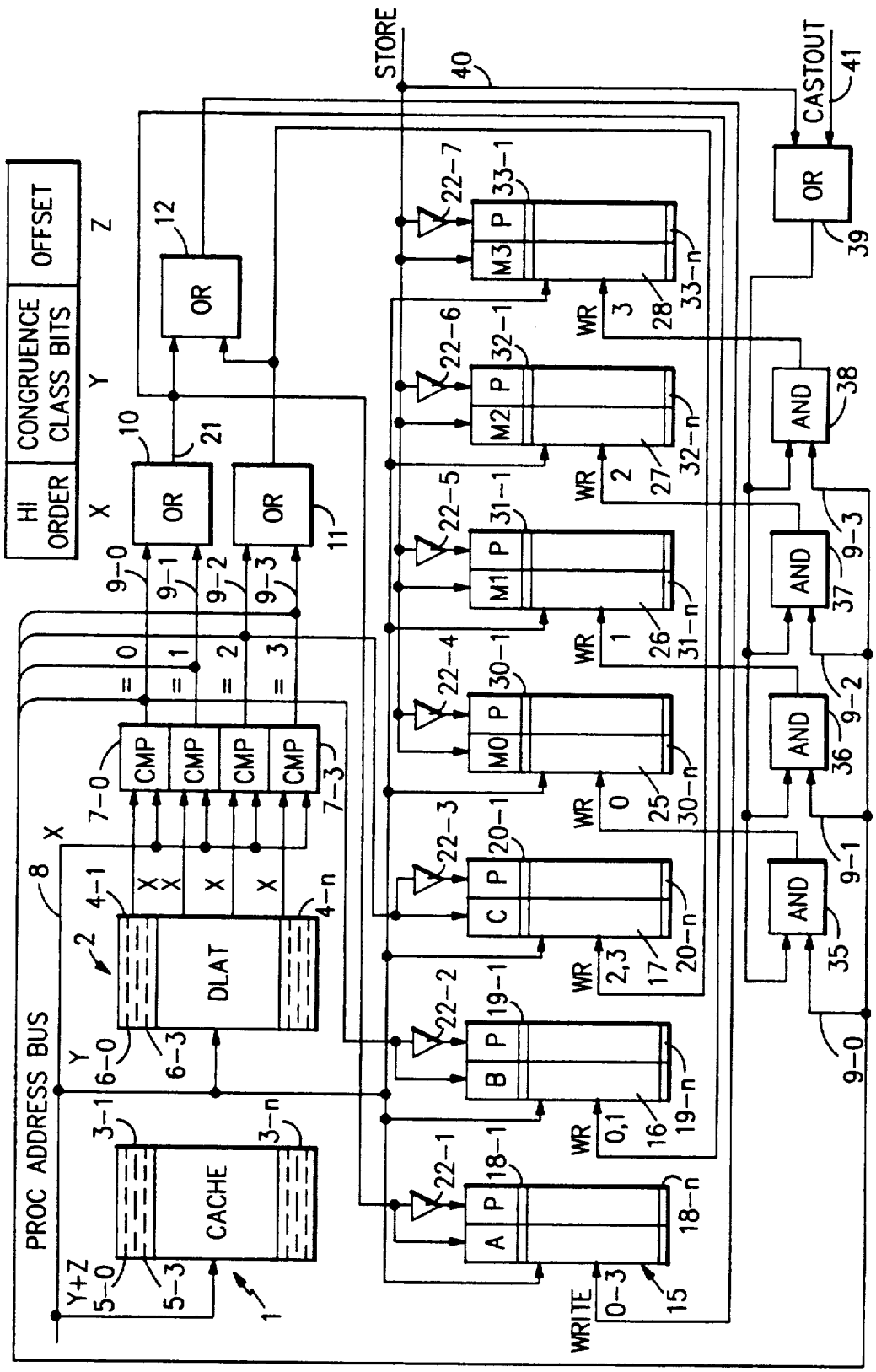
FIG. 1 is a partially diagrammatic, partially schematic illustration of a preferred form of the improvement using a quasi LRU replacement algorithm.

Attention is first directed to the illustration of two embodiments in FIGS. 1 and 2. Both embodiments are directed toward the use of a "replacement" algorithm preferably for use with a cache storage. One of the more well known algorithms is the classical LRU algorithm which uses sufficient usage bits in its binary code to provide all possible valid combinations of historical usage bits. For example, with four-way associativity a six bit code is often used which provides 64 logical combinations of bits only 24 of which are valid.

The embodiment of FIG. 1 uses an algorithm which provides only a three bit code which is a trade off between the amount of hardware used and the selection of the truly "least recently used" associativity class. In this embodiment, a "less recently used" class rather than the "least recently used" class will be selected for replacement.

The embodiment of FIG. 2 illustrates a classical LRU algorithm for three-way associativity using a three bit code.

In both embodiments, the "use" bits will be referred to as LRU bits for ease of description.

Referring to FIG. 1, a cache 1 and its DLAT 2 are divided respectively into a plurality of congruence classes 3-1 to 3-n and 4-1 to 4-n. Each cache congruence class is further divided into four associativity classes such as 5-0 to 5-3 and each DLAT congruence class is divided into four associativity classes 6-0 to 6-3. Four compare circuits 7-0 to 7-3 inclusive determine whether or not a cache hit occurs in one of the associative classes of a congruence class addressed via a processor address bus 8.

Outputs 9-0 to 9-3 inclusive of compare circuits 7-0 to 7-3 are coupled via OR circuits 10, 11, 12 to the WRITE inputs to LRU arrays 15, 16, 17. Each LRU array 15, 16, 17 includes an entry corresponding to each congruence class of the cache and DLAT 2. Thus arrays 15, 16, and 17 have congruence class entries 18-1 to 18-n, 19-1 to 19-n and 20-1 to 20-n respectively.

Outputs 9-0 and 9-2 form DATA inputs to LRU arrays 16 and 17 respectively. Output 21 of OR circuit 10 forms a DATA input to LRU array 15. Inverters 22-1 to 22-3 provide odd parity bit inputs to the second bit positions of array 15, 16 and 17.

Modify bit arrays 25-28 are provided, one for each associativity class. Each of the arrays 25-28 has a plurality of congruence class entries (i.e. 30-1 to 30-n, 31-1 to 31-n, 32-1 to 32-n and 33-1 to 33-n) equal in number to the cache and DLAT congruence classes.

The outputs of AND gates 35-38 form WRITE inputs to arrays 25-28 respectively. Outputs 9-0 to 9-3 provide inputs to AND gates 35-38 respectively. Second inputs to the AND gates 35-38 are provided by an OR circuit 39. STORE and CASTOUT lines 40, 41 provide inputs to OR circuit 39.

The STORE line 40 also provides a DATA input to each of the modify bit arrays 25-28. Inverters 22-4 to 22-7 provide odd parity bit inputs to the second bit positions of the modify arrays 25-28.

The processor address bus 8 couples congruence class address bits to each of the arrays 15-17 and 25-28. Appropriate read controls (not shown) permit read out of the use and modify bits.

As described above, the requirement for Read/Modify/Write cycles to maintain and update LRU binary codes for the associativity classes of each congruence class is obviated by providing separately addressable arrays for the LRU implementation.

In the preferred embodiment of FIG. 1, the data cache 1 is four way associative, with n congruence classes. The LRU array is used to hold the three LRU bits A, B, C, four modify bits M0-M3 and parity bits for each congruence class.

The LRU bits are used to select which associativity class has been less recently used by the processor (not shown) and should be overwritten when it is necessary to page in new data from main storage (not shown).

The modify bits are used to signify whether the processor (CPU) has changed the data in the corresponding associativity class of the cache since the data was paged in from storage. This will dictate if the data in cache selected by the LRU bits to be overwritten can in fact be overwritten, or if it has been changed and must be paged back out to main storage.

The LRU array is formed by the seven nx2 arrays 15-17, 25-28, each of which contains a LRU or Modify bit plus parity for each congruence class. This configuration allows only the bits that are changing to be written, with the other bits left alone. The methods used to select the LRU and Modify bits to write will now be described.

The data cache LRU binary code of the described embodiment is comprised of three bits which are decoded as follows

TABLE 1

| LRU Bits | | | | Least recently accessed associativity class |
|---|---|---|---|---|
| A | B | C | | |
| 0 | 0 | x | = | class 0 |
| 0 | 1 | x | = | class 1 |
| 1 | x | 0 | = | class 2 |
| 1 | x | 1 | = | class 3 |

In order to update the necessary LRU bits without reading them first, the algorithm shown below is used:

LRU Bit A
IF CPU accesses class 0 or 1, data=1
IF CPU accesses class 2 or 3, data=0
WRITE if the CPU accesses class 0, 1, 2 or 3

LRU Bit B
IF CPU accesses class 0, data=1
IF CPU accesses class 1, data=0
WRITE if CPU accesses class 0 or 1

LRU Bit C
IF CPU accesses class 2, data=1
IF CPU accesses class 3, data=0
WRITE if CPU accesses class 2 or 3

LRU bit A is always written when the CPU successfully accesses the cache, i.e. a "cache hit". The value written for bit A is a '1' if the CPU accessed class 0 or 1, and is set to a '0' if class 2 or 3 is accessed. LRU bit B is written only when the CPU accesses class 0 or 1. The value written for bit B is a '1' if class 0 is accessed and a '0' if class 1 is accessed. Similarly, LRU bit C is written only when class 2 or 3 is accessed, a '1' if class 2 is accessed, and a '0' if class 3 is accessed.

This method of LRU updating eliminates the need to READ/MODIFY/WRITE the arrays in one machine cycle.

The method for individual modify bit updating is shown below:

Modify Bit 0
IF CASTOUT class 0 then data=0
IF STORE to class 0 then data=1
Write if CASTOUT or STORE to class 0

Modify Bit 1
IF CASTOUT class 1 then data=0
IF STORE to class 1 then data=1
Write if CASTOUT or STORE to class 1

Modify Bit 2
IF CASTOUT class 2 then data=0
IF STORE to class 2 then data=1
Write if CASTOUT or STORE to class 2

Modify Bit 3
IF CASTOUT class 3 then data=0
IF STORE to class 3 then data=1
Write if castout or store to class 3

The modify bit M0-M3 for a particular associativity class is set to a '1' only when the CPU writes to that class, a logical '1' signal on STORE line 40. The modify bit is reset to a '0' only when the modified data is paged out to main storage and new 'unmodified' data is written in its place in the cache 1. A logical '1' signal placed on CASTOUT line 41 and a logical '0' is placed on STORE line 40.

Since only one modify bit is ever set or reset during any CPU operation, at most only one of the modify arrays is clocked by its respective AND gate 38—38 in any given machine cycle. Again the need to READ/-MODIFY/WRITE all four modify bits M0-M3 has been eliminated, obviating the constraint that machine cycle time must be at least one array READ/-MODIFY/WRITE cycle long.

Referring again to FIG. 1, it will be seen that the arrays 15-17 and 25-28 and associated logic implement the methods described above. Assume that the processor (not shown) places an address on bus 8 to access the cache 1. The congruence class bits of the address select the four associativity classes of the appropriate congruence class in DLAT 2 and place their contents (the higher order address bits of data stored in the corresponding associativity classes within the cache 1) into compare circuits 7-0 to 7-3.

If the data sought by the address on bus 8 is in cache 1, the high order bits stored in one of the four associativity classes will match (equal) the corresponding high order address bits on bus 8, causing an equal compare signal on one of the outputs 9-0 to 9-3.

Assuming a compare equal signal on line 9-0, it applies a logical '1' signal to the DATA input of array 16 (LRU bit B). At the same time, a write input is applied to array 16 via line 9-0 and OR circuit 10.

A logical '1' DATA input is also applied to array by line 9-0 via OR circuit 10 and its output 21. A WRITE signal is applied to array 15 by line 9-0 via OR circuits 10 and 12.

The congruence address bits on bus 8 select the appropriate congruence class positions in arrays 15, 16 to write '1' in LRU bits A and B.

Similarly a compare equal signal on line 9-1 causes bits 1, 0 to be entered into array bits A and B respectively. A compare equal signal on line 9-2 causes logical bits 0, 1 to be entered into array bits A and C respectively. A compare equal signal on line 9-3 causes logical bits 0, 0 to be written into array bits A and C respectively.

To illustrate the difference between the algorithms of FIGS. 1 and 2, assume a state in the LRU of 00x for the A, B, C bits of a congruence class being selected for access. Associativity class 0 (Table 1) is therefore the least recently used class.

Assume further that the next access is to associativity class 0 which causes logical bits 1, 1 to be written into the appropriate A and B array location. This results in either associativity class 2 (1,1,0) or 3 (111) now being the new "least recently used" class depending upon the previous history of the C bit which has not been changed.

However, it is possible that associativity class 1 should have been identified as the least recently used class but this is ruled out because the A bit has been changed to a '1'. As previously mentioned, a six bit code is required to provide this higher level of selectivity found in the classical LRU algorithm; but the six bit code requires a much more expensive implementation.

FIG. 2 is illustrated to show an implementation of the present improvement with a classical LRU algorithm. For ease of description, it is assumed that a three-way rather than a four-way associativity is provided for each congruence class. Therefore, compare circuit 7-3, AND circuit 38 and modify bit M3 array 28 are not required. The logic of OR circuits 10, 11 and 12 (FIG. 1) are replaced by the logic of FIG. 2.

The table below shows the chronology sequence and code bits for the LRU algorithm with six of eight possible logical bit combinations being valid:

| Chronology Sequence | A OA1 | B OA2 | C 1A2 |
| --- | --- | --- | --- |
| 012 | 1 | 1 | 1 |
| 021 | 1 | 1 | 0 |
| 102 | 0 | 1 | 1 |
| 120 | 0 | 0 | 1 |
| 210 | 0 | 0 | 0 |
| 201 | 1 | 0 | 0 |

In the column "chronology sequence", the last (rightmost) associativity class is the least recently used and the first (left-most) is the most recently used class. Thus for sequence 012, 2 is the least recently used class.

In the code bit columns A, B, C, the expression OA1 means that associativity class 0 was selected after (subsequent to) the last selection of class 1; 0A2 means class 0 was selected after class 2; 1A2 means class 1 was selected after class 2.

According to the algorithm, if associativity class 0 is selected, logical '1's are written into array bits A and B; if class 1 is selected, logical 0 and 1 are written into bits A and C respectively; and if class 2 is selected logical '0's are written into bits B and C.

The logic of FIG. 2 implements this algorithm. A compare equal line 49-0 is coupled to the WRITE inputs of arrays A and B via OR circuits 50, 51. Line 49 also applies a logical '1' signal to the DATA inputs to the arrays A and B via logical "1" inputs to drivers 52, 53 to WRITE 1, 1 into arrays A, B.

Compare equal line 49-1 is coupled to write inputs of arrays A and C via OR circuits 50 and 54, to the DATA input of array A via the logical "0" input to driver 52 and to the DATA input of array C via driver 56. This writes 0, 1 into arrays A and C respectively.

Compare equal line 49-2 is coupled to WRITE inputs to arrays B and C via OR circuits 51 and 54, to the DATA input of array B via the logical "0" input to driver 53 and to the DATA input of array C via the logical "0" input to driver 56. This writes 0, 0 into the array bits B and C.

While the invention has been shown and described with reference to a preferred embodiment and modifications thereof, it will be understood by those skilled in the art that various changes in form and detail may be made therein without departing from the spirit and scope of the invention.

What is claimed is:

1. A computer system comprising:
   a four-way associative cache having groups of memory locations, each of said groups comprising four associative classes, said cache including means for coupling to a CPU and permitting said CPU to individually access each of said associative classes;
   means for determining which associative class is currently being accessed by said CPU;
   a storage array for storing indications of relative order of access by said CPU to the associative classes within each group, said array including a separately addressable entry for each group, said storage array also storing parity bits for each of said entries; and
   storage array control means, coupled to said storage array and the determining means, for directly updating, without first reading, the entry in said storage array corresponding to the group containing the associative class that is currently being accessed by said CPU with an indication of relatively recent access to said associative class compared to other associative classes within said group, and writing the respective parity bits for the entry; and
   wherein there are exactly four associative classes within each group, each of said entries of said storage array utilizes exactly three bits to indicate said relative order of access, and there is a one-to-one correspondence between each of said parity bits and each bit of the corresponding entry in said storage array; and
   said storage array control means sets one of the three bits of the entry corresponding to the currently accessed group to indicate that two of the associative classes within the group have not been accessed by the current access, and sets another one of the three bits to indicate that one of the other two of the associative classes within the gorup has not been accessed by the current access.

2. A computer system as set forth in claim 1 further comprising means for determining if the associative class that is currently accessed by said CPU is being updated during said access; and wherein
   said storage array also stores indications of which of said associative classes has been updated during access by said CPU, said storage array including a separately addressable entry for each of said associative classes to indicate update of said associative class;
   said storage array control means directly updates, without first reading, the entry in said storage array corresponding to an associative class that is currently being updated with an indication that said associative class has been updated at least once since said associative class was read from a main memory; and
   said storage array control means simultaneously makes the update to the entry indicating relatively recent access to the associative class and the update indicating that the currently accessed associative class has been updated.

3. A computer system as set forth in claim 1 wherein the associative classes within each group are divided into two sets of two associative classes each, and said one bit indicates relative order of access as between the two sets, and said other bit indicates relative order of access between the tow associative classes in the set containing the currently accessed associative class.

4. A computer system as set forth in claim 3 wherein the remaining bit indicates relative order of access between the two associative classes in the other set.

* * * * *